(12) United States Patent
Watson et al.

(10) Patent No.: US 11,875,322 B2
(45) Date of Patent: *Jan. 16, 2024

(54) AUTOMATED TRANSACTION MACHINE WITH ASSOCIATED BEACON

(71) Applicant: Diebold Nixdorf, Incorporated, North Canton, OH (US)

(72) Inventors: Devon Watson, North Canton, OH (US); Douglas Kurt Hartung, Kingwood, TX (US); Vanessa Gagnon, Stow, OH (US); Gregory Shimek, Akron, OH (US); Gary A. Ganger, Uniontown, OH (US)

(73) Assignee: Diebold Nixdorf, Incorporated, Hudson, OH (US)

( * ) Notice: Subject to any disclaimer, the term of this patent is extended or adjusted under 35 U.S.C. 154(b) by 372 days.

This patent is subject to a terminal disclaimer.

(21) Appl. No.: 17/101,632

(22) Filed: Nov. 23, 2020

(65) Prior Publication Data

US 2021/0073760 A1 Mar. 11, 2021

Related U.S. Application Data

(63) Continuation of application No. 15/604,628, filed on May 24, 2017, now Pat. No. 10,867,290.

(Continued)

(51) Int. Cl.
*G06Q 30/00* (2023.01)
*G06Q 20/10* (2012.01)
(Continued)

(52) U.S. Cl.
CPC ..... *G06Q 20/1085* (2013.01); *G06Q 20/3224* (2013.01); *G07C 9/00182* (2013.01); *G07F 19/20* (2013.01)

(58) Field of Classification Search
CPC ............... G07C 9/00182; G07F 19/20; G06Q 20/1085; G06Q 20/3224
(Continued)

(56) References Cited

U.S. PATENT DOCUMENTS 5,825,436 A * 10/1998 Knight .................. G02F 1/1323
349/16
6,604,085 B1 * 8/2003 Kolls .................. G06Q 30/0239
705/26.25

(Continued)

FOREIGN PATENT DOCUMENTS

EP 1926263 5/2008
GB 2442798 4/2008
(Continued)

OTHER PUBLICATIONS

Marous, Jim. 10 Ways iBeacon Can Improve Banking Sales & Service. (Mar. 31, 2014). Retrieved online Mar. 5, 2020. https://thefinancialbrand.com/38160/ibeacon-bank-branch-mobile-cross-selling/ (Year: 2014).*

(Continued)

*Primary Examiner* — James A Reagan
(74) *Attorney, Agent, or Firm* — Black McCuskey (57) ABSTRACT

An Automated Transaction Machine (ATM) is associated with a beacon. The beacon may communicate with an electronic device running a software application that is configured to detect the beacon. The software application may have a reaction based upon the detection of the beacon. The ATM or related systems may respond to data directly or indirectly from the software application to make a customization or take other action based there on.

18 Claims, 7 Drawing Sheets

Related U.S. Application Data (60) Provisional application No. 62/340,631, filed on May 24, 2016.

(51) Int. Cl.
 *G06Q 20/32* (2012.01)
 *G07F 19/00* (2006.01)
 *G07C 9/00* (2020.01)

(58) Field of Classification Search
 USPC .................................. 705/43, 39, 35; 235/79
 See application file for complete search history.

(56) References Cited

U.S. PATENT DOCUMENTS

| | | | | |
|---|---|---|---|---|
| 9,122,966 | B2 * | 9/2015 | Glaser | G06V 40/45 |
| 9,489,609 | B2 * | 11/2016 | Glaser | G06K 19/07701 |
| 10,032,148 | B2 * | 7/2018 | Glaser | G06F 21/35 |
| 10,055,726 | B2 * | 8/2018 | Kursun | G06Q 20/3221 |
| 10,078,816 | B2 * | 9/2018 | Smolk | G07F 19/201 |
| 10,713,631 | B2 * | 7/2020 | Glaser | G06V 40/70 |
| 11,403,608 | B2 * | 8/2022 | Glaser | G06Q 20/34 |
| 2001/0016819 | A1 * | 8/2001 | Kolls | G07F 9/026 |
| | | | | 705/14.1 |
| 2003/0065563 | A1 * | 4/2003 | Elliott | G06Q 20/10 |
| | | | | 705/14.53 |
| 2008/0074264 | A1 * | 3/2008 | Sharpe | H04L 67/53 |
| | | | | 340/572.1 |
| 2010/0005002 | A1 * | 1/2010 | Lazaridis | G06Q 20/20 |
| | | | | 705/17 |
| 2014/0183269 | A1 * | 7/2014 | Glaser | G06K 19/07701 |
| | | | | 235/492 |
| 2015/0356285 | A1 * | 12/2015 | Glaser | G06V 40/45 |
| | | | | 726/7 |
| 2016/0012411 | A1 * | 1/2016 | Kursun | G07F 19/205 |
| | | | | 705/42 |
| 2016/0019537 | A1 * | 1/2016 | Raja | G07F 19/203 |
| | | | | 705/43 |
| 2016/0063477 | A1 * | 3/2016 | Egan | G06Q 20/327 |
| | | | | 455/406 |
| 2016/0078742 | A1 * | 3/2016 | Fernandez | G07F 19/207 |
| | | | | 340/686.6 |
| 2016/0337548 | A1 * | 11/2016 | Osborn | G06F 16/7867 |
| 2017/0053253 | A1 * | 2/2017 | Glaser | G06V 40/70 |
| 2017/0323381 | A1 * | 11/2017 | Todd | G06Q 40/02 |
| 2017/0344965 | A1 * | 11/2017 | Watson | G06Q 20/3224 |
| 2018/0160260 | A1 * | 6/2018 | Meganathan | G08B 13/19682 |
| 2018/0349869 | A1 * | 12/2018 | Glaser | G06F 3/0346 |
| 2020/0349538 | A1 * | 11/2020 | Glaser | G06K 19/07701 |

FOREIGN PATENT DOCUMENTS

| | | | | | |
|---|---|---|---|---|---|
| GB | 2453806 | A | * | 4/2009 | H04N 13/31 |
| GB | 2466934 | A | * | 7/2010 | G07F 19/20 |
| WO | 2016048953 | | | 3/2016 | |
| WO | 2016070173 | | | 5/2016 | |

OTHER PUBLICATIONS

ATM Marketplace. Citi debuts beacon-based access to ATM vestibules. (May 16, 2016). Retrieved online Mar. 5, 2020. https://www.atmmarketplace.com/news/citi-debuts-beacon-based-access-to-atm-vestibules/ (Year: 2016).*

ATM Marketplace. Diebold, Cuscal test benefits of beacon technology at ATMs. (Nov. 22, 2016). Retrieved online Mar. 5, 2020. https://www.atmmarketplace.com/news/diebold-cuscal-test-benefits-of-beacon-technology-at-atms/ (Year: 2016).*

PCT International Search Report and Written Opinion dated Aug. 29, 2017; 12 pages.

PCT International Preliminary Report on Patentability dated Nov. 27, 2018; 8 pages.

Communication pusuant to ARtile 94(3) EPC filed in the corresponding European application dated Mar. 31, 2021; 11 pages.

* cited by examiner

AUTOMATED TRANSACTION MACHINE WITH ASSOCIATED BEACON

CROSS-REFERENCE TO RELATED APPLICATIONS

This application is a continuation of U.S. patent application Ser. No. 15/604,628, filed May 24, 2017, which issued on Nov. 24, 2020, as U.S. Pat. No. 10,867,290, which claims priority to and the benefit of U.S. Provisional Patent Application 62/340,631, filed May 24, 2016.

BACKGROUND

This relates in general to Automated Transaction Machines (ATMs) and related technology.

ATMs are generally known. One type of ATM is the Automated Banking Machine (ABM). ABMs are generally used in a banking environment to allow banking customers to perform automated banking transactions, such as deposit, withdraw, or otherwise move funds electronically from one account to another.

Other ATMs are often used in other environments. For example, some ATMs may be used to dispense tickets at sporting events, musical events and the like. Some other ATMs may be used to dispense gambling tokens or to accept gambling tokens to be converted back into cash. Further example of ATMs are known.

SUMMARY

This relates more specifically to an ATM with an associated beacon, to various configurations thereof, and to apparatuses, systems, and methods related to the same.

In one example, an ATM may use a beacon to sense a customer, via a customer's device, approaching an ATM. In another example, a customer's device may sense an approaching ATM via the beacon.

In at least one embodiment, a system may operate for controlling security to an ATM, such as for unlocking a vestibule door. The system may include a vestibule with a secure door, a server, an ATM inside the vestibule, and a beacon. An electronic device running a software application may detect the beacon. After detecting the beacon, the software application may communicate with the server that a unique identification of the electronic device is requesting access to the vestibule. The server is configured to cause data to be sent to a lock on the door to unlock the door whereby a customer associated with the unique identification is authorized to enter the vestibule.

In at least one other embodiment, a system may deliver information to a customer at an ATM based on the identification of a unique customer based on their device and the signal delivered from the beacon. The system may include a server and a beacon. The beacon may be configured to transmit a wireless signal to an electronic device running a software application to be received by the electronic device as a customer with the electronic device approaches the beacon. Upon detecting the wireless signal, the electronic device may send an identity of the customer owning the electronic device to the server. After optionally verifying that the identity is valid, the server may send data to the ATM to cause the display to present information tailored to the customer.

In at least one other embodiment, a system for collecting and storing information about a customer using an electronic device may include a server, an ATM with a display, a database that communicates with the server, and a beacon. The electronic device, running a software application, may detect the beacon as the electronic device approaches the beacon. The electronic device may send wireless data to the server indicating a unique identity of the electronic device and/or the beacon detected. Upon optionally verifying the identity, the server may cause collecting of data from the electronic device associated with the customer and storing the data in the database. The server may analyze this data and if values of this data fall outside predetermined ranges then the server generates an alarm notification so corrective action may be taken. In some additional embodiments, the server may send media, such as advertisement material, based on the collected data to the customer, either via the electronic device or via the display of the ATM. The presentation of this media may be initiated once the customer is a predetermined distance from the display. Further, this media may be sent to any appropriate device associated with the user or ATM such as an associated display, a tablet, a smart screen, a smart glass, a phone, other electronic device and/or another device associated with the ATM or user.

In at least another embodiment, a system may be configured to monitor the flow of customers and other data in a commercial environment, such as a banking area. The system may generates one or more alerts when certain parameters are above or below certain thresholds. The system may include at least one ATM in a commercial environment, a server, a database in communication with the server, and a beacon associated with the server. Electronic devices running software to detect the beacon may be carried (or moved) by customers or other users. As these devices move within range of the beacon, they may detect the beacon. Upon detecting the beacon, the electronic devices may send a unique identifier to the server identifying an electronic device associated with one of the customers and the beacon identified. Upon optionally authenticating unique identifiers, the server may collect data from the electronic devices. The data may include one or more of: duration of customer visits, times of visits, and locations the customer visited, dwell time at an ATM, location of the ATM and the customer, and ATM transactional information. The server may generate an alert when one or more of the data fall outside of a predetermined threshold.

In at least yet another embodiment, a system may detect a customer of interest is near a beacon and may send a message to someone who may wish to be alerted to the presence of the potential customer, for example, to greet the potential customer. The system may include a server and a beacon. An electronic device that is carried (or moved) by a user, such as the potential customer may run software to detect the beacon when the electronic device moves within range of the beacon. Upon detecting the beacon, the electronic device may send a unique identifier to the server identifying the electronic device associated with the potential customer and/or the identify the beacon or data related to the beacon. Upon optionally verifying the unique identifier, the server may cause a data message to be sent to a person or related device who desired is to be alerted when the user or customer associated with the electronic device was at a location near the beacon.

In at least one additional embodiment, a system may use geo-fencing to allow access into a secured area, such as a vestibule. The system may include a secured area, such as a vestibule with a secure door or other enclosed area with selective entry, a server, a geo-fencing system, and an ATM within the secured area. A location of the ATM may be been pre-located by the geo-fencing system. A customer or other user may be carrying an electronic device, such as a smartphone. The server may receive a message from a geo-fencing software application running on the electronic device that the electronic device is within a predetermined distance of the ATM. The server may then cause data to be sent to allow access to the secured area, such as a command to unlock a door, when the identity of the customer is authorized by the server to enter the secured area. For further example, in the specific case of a vestibule with an ATM therein, a system for unlocking the vestibule door may include a vestibule with a secure door, a server, an ATM inside the vestibule, and a beacon associated with at least one of the ATM or the vestibule. After detecting the beacon, a software application may communicate with the server to requesting access to the vestibule. The server may be configured to cause data to be sent to the lock on the door to unlock the door when authorization to enter the vestibule is granted.

Various aspects will become apparent to those skilled in the art from the following detailed description and the accompanying drawings.

BRIEF DESCRIPTION OF THE DRAWINGS

Similar numerical identifiers are intended to refer to similar elements throughout the drawings.

DETAILED DESCRIPTION

Figure 1:
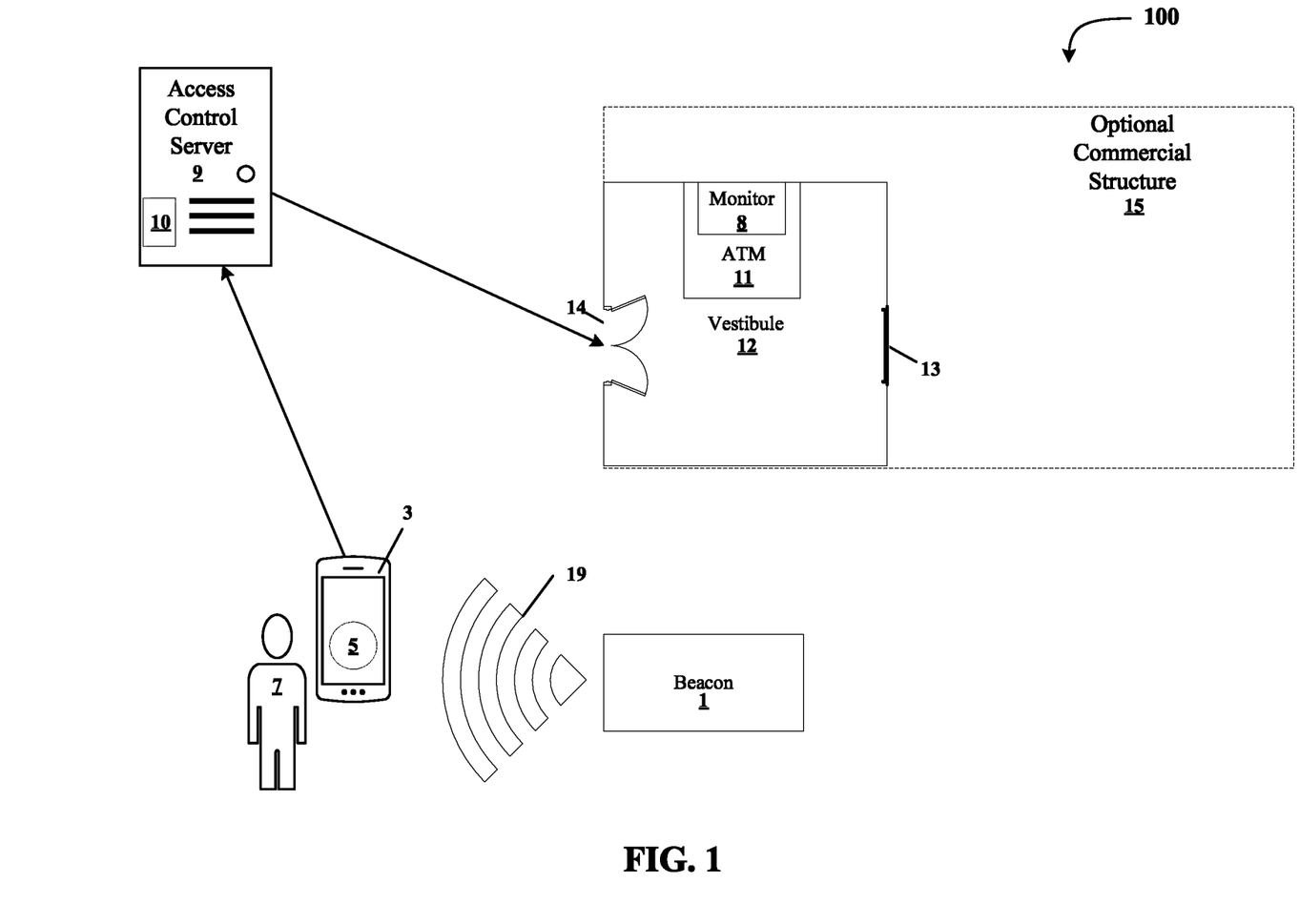
FIG. 1 is a schematic illustration of a system including an ATM and an associated beacon according to a first embodiment.

FIG. 1 illustrates one embodiment of a system 100 that unlocks a secure entry, exterior access door 14 to a secure area, vestibule 12. An optional interior door 13 separates the vestibule 12 from an optional commercial structure 15. The vestibule 12, in some embodiments, may include an automated transaction machine (ATM) 11 that may include a monitor 8 for displaying menu options, images, videos such as advertisement video and the like. The ATM 11 may be a traditional banking ATM such as one that accepts deposits and/or dispenses cash, it could also be an ATM at which issues tickets to sporting events may be purchased or may be another type of transaction machine. The vestibule 12 includes the exterior access door 14 such that a customer may use to access the ATM 11 inside the vestibule 12 when the optional commercial structure 15 and the interior door 13 are closed/locked.

The system 100 further includes a beacon 1 and a server 9 that may be an access control server or another type of server. The beacon 1 is illustrated as separate from the ATM 11 and outside the secure area 12, although neither are recurred. For example, the beacon 1 may be coupled to or integrated with the ATM 11 and the beacon 1 may be within or without the secure area 12.

In the present example, the server 9 is in communication with the door 14. In one embodiment, the beacon 1 emits electromagnetic radiation of a desired frequency or frequencies and with a desired power. In other configurations, the beacon 1 may transmit coded information such as a unique number sequence on a modulated carrier and an electronic device 3, discussed below, may decode this signal to extract the number sequence to determine if beacon 1 is of interest to the customer using the electronic device 3. It must be appreciated that other types of beacons may be used in other embodiments and in some embodiments the beacon 1 and an access control server 9 may communicate with each other. For example, in at least one instance the beacon 1 maybe a passive beacon only responding to calls from a requesting device.

The server 9 may contain a processor 10 or other logic allowing the server 9 to execute tangible software instructions that are read from memory and to perform other functions. "Processor" and "Logic", as used herein, includes but is not limited to hardware, firmware, software, and/or combinations of each to perform a function(s) or an action(s), and/or to cause a function or action from another logic, method, and/or system. For example, based on a desired application or needs, logic and/or processor may include a software-controlled microprocessor, discrete logic, an application specific integrated circuit (ASIC), a programmed logic device, a memory device containing instructions or the like. Logic and/or processor may include one or more gates, combinations of gates, or other circuit components. Logic and/or a processor may also be fully embodied as software. Where multiple logics and/or processors are described, it may be possible to incorporate the multiple logics and/or processors into one physical logic (or processors). Similarly, where a single logic and/or processor is described, it may be possible to distribute that single logic and/or processor between multiple physical logics and/or processors.

Figure 2:
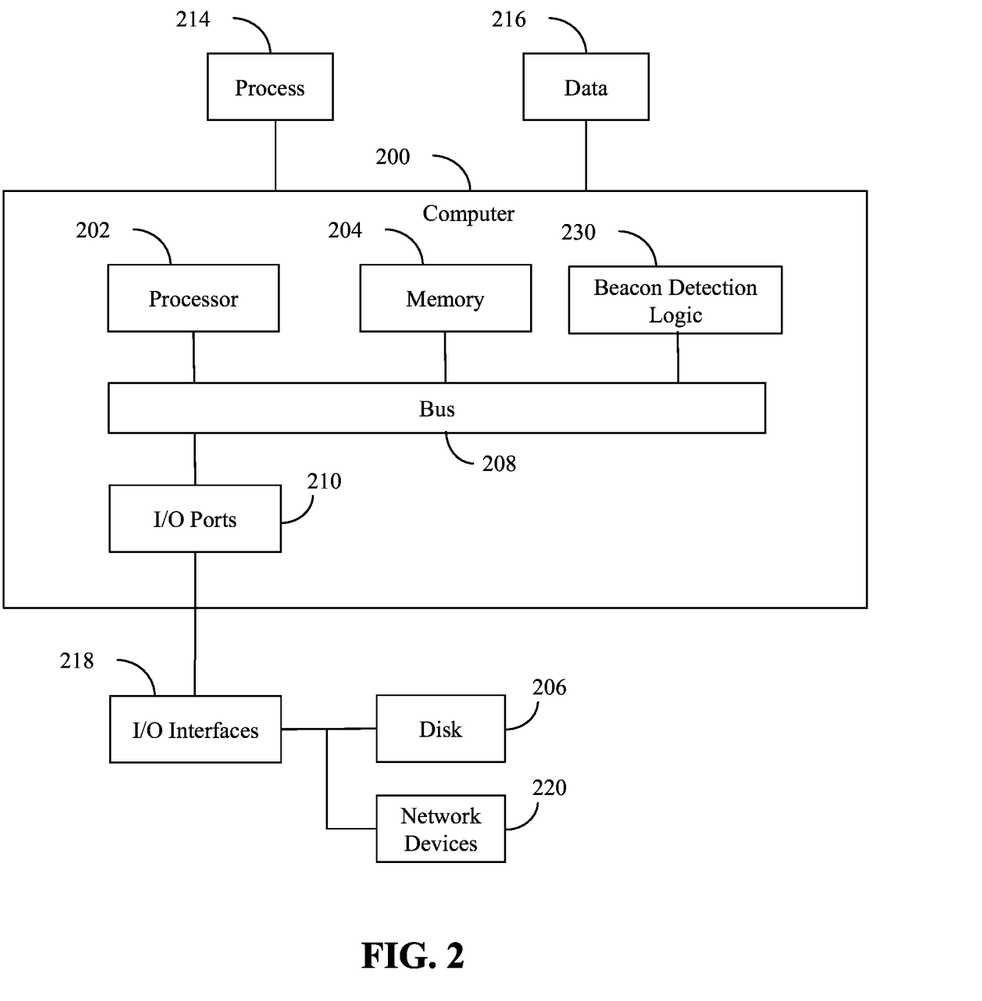
FIG. 2 is a schematic diagram of a computer system with a beacon detection logic for use with the system of FIG. 1.

FIG. 2 illustrates one example architecture of how the server 9 (e.g., a computer) may be organized. Thus, FIG. 2 illustrates one example computing device (e.g., server 9) in which at least portions of example systems and methods described herein, and equivalents, may operate. The example computing device may be a computer 200 that includes a processor 202, a memory 204, and input/output ports 210 operably connected by a bus 208. In one example, the computer 200 may include a beacon detection logic 230 configured to look for periodic beacon signals transmitted by a beacon or relayed from another device or for signals from another device indicative of that device having received a signal from a beacon. In different examples, the beacon detection logic 230 may be implemented in hardware, software, firmware, and/or combinations thereof. Thus, the beacon detect logic 230 may provide means (e.g., hardware, software, firmware) for searching for one or more beacon signals. While the beacon detect logic 230 is illustrated as a hardware component attached to the bus 208, it is to be appreciated that in one example, the beacon detect logic 230 could be implemented in the processor 202.

Generally describing an example configuration of the computer 200, the processor 202 may be a variety of various processors including dual microprocessor and other multi-processor architectures. The memory 204 may include volatile memory and/or non-volatile memory. Non-volatile memory may include, for example, ROM, PROM, EPROM, and EEPROM. Volatile memory may include, for example, RAM, synchronous RAM (SRAM), dynamic RAM (DRAM), synchronous DRAM (SDRAM), double data rate SDRAM (DDR SDRAM), direct RAM bus RAM (DR-RAM) and the like.

A disk 206 may be operably connected to the computer 200 via, for example, an input/output interface (e.g., card, device) 218 and an input/output port 210. Disk 206 may be, for example, a magnetic disk drive, a solid-state disk drive, a floppy disk drive, a tape drive, a Zip drive, a flash memory card, and/or a memory stick. Furthermore, the disk 206 may be a CD-ROM, a CD recordable drive (CD-R drive), a CD rewriteable drive (CD-RW drive), and/or a digital video ROM drive (DVD ROM). The memory 204 can store a process 214 and/or a data 216, for example. The disk 206 and/or the memory 204 can store an operating system that controls and allocates resources of the computer 200.

The bus 208 may be a single internal bus interconnect architecture and/or other bus or mesh architectures. While a single bus is illustrated, it is to be appreciated that the computer 200 may communicate with various devices, logics, and peripherals using other busses (e.g., PCIE, SATA, Infiniband, 1384, USB, Ethernet). The bus 208 can be types including, for example, a memory bus, a memory controller, a peripheral bus, an external bus, a crossbar switch, and/or a local bus.

The computer 200 may interact with input/output devices via the input/output interfaces 218 and the input/output ports 210. Input/output devices may be, for example, a keyboard, a microphone, a pointing and selection device, cameras, video cards, displays, the disk 206, the network devices 220, and so on. The input/output ports 210 may include, for example, serial ports, parallel ports, USB ports, and the like.

The computer 200 can operate in a network environment and thus may be connected to network devices 220 via input/output interfaces 218, and/or the input/output ports 210. Through the network devices 220, the computer 200 may interact with a network. Through the network, the computer 200 may be logically connected to remote computers. Networks with which the computer 200 may interact include, but are not limited to, a local area network (LAN), a wide area network (WAN), and other networks. The networks may be wired and/or wireless networks.

Returning to FIG. 1, while not required to be part of part of the system 100, the system 100 may be activated by a customer 7 transporting the electronic device 3 running a software program 5 in proximity of the beacon 1. As mentioned earlier, the system 100, in one embodiment includes a secured vestibule area 12 with an ATM 11 located inside the vestibule area 12. Often after hours, for example, the optional commercial structure 15 and its interior door 13 will be locked so that the only way to access the vestibule 12 is through its exterior door 14.

The system 100, described above, provides for exchanging unique identity information between the customer and the access control server 9 of the system 100. In one embodiment, a customer 7 (FIG. 1) approaches the beacon 1 with his/her electronic device 3 running a software application 5. In one example, the electronic device 3 may be a mobile cellphone or smartphone. However, the electronic device 3 may be an iPad, tablet computer, laptop computer, or other suitable device to communicate with the beacon 1 and server 9.

The electronic device 3 in combination with its software 5 begins to detect the beacon 1 when it is close enough to the beacon 1, e.g. in communication range. As discussed above, the electronic device 3 may detect the beacon 1 by detecting a particular frequency or particular frequencies emitted by the beacon 1, detect an encoded/modulated number sequence that the electronic device 3 decodes in tandem with its software 5, or detects the beacon 1 in another way as desired. FIG. 1 illustrates signals emitted by the beacon 1 as electromagnetic waves 19 for illustrative purposes.

After the beacon 1 has been detected and its signal decoded, the electronic device 3 with its software 5 may determine if it is of interest. For example, frequencies and/or data periodically transmitted by the beacon 1 may indicate that it is a beacon near the ATM 11. If the beacon 1 is of interest and there is a desire to access the ATM 11, for example, then the electronic device 3 in combination with the software application 5 will communicate a unique identification of the electronic device 3 to the server 9 and request access to the to the vestibule 12/ATM 11. This communication may include a phone ID and a beacon ID, or other identification data related to an electronic device, the software or the user.

In some embodiments, this communication may be wirelessly directly sent to the access control server 9 or the communication may first be sent to a local antenna (not illustrated) such as a wireless LAN base station antenna before it is then routed to the access control server 9. In another configuration, the electronic device 3 may transmit messages to the beacon 1 and these messages may then be forwarded to the server 9. The communication may be directly between the devices, or indirectly, such as through a series of relays, networks, the internet, or other suitable communications mechanism.

When the communications are received from the electronic device 3 at the server 9, the server 9 may check to be sure the unique identification is valid and matches the electronic device 3. Any suitable verification method may be used to validate the identification of the electronic device 3 at the server 9. For example, common cryptographic functions and methodologies may be used. Once the server 9 authenticates the electronic device, the server 9 causes data to be sent to a lock on the door 14 to unlock the door 14 when the unique identification indicates the customer with the electronic device (e.g., phone) is authorized to enter the vestibule 12.

In another configuration, the system 100 will not "automatically" unlock the door 14 of the vestibule 12 upon the electronic device 3 detecting the beacon 1. Instead, when the electronic device 3 detects the beacon 1, the electronic device 3 and its software 5 will first display a message on a screen of the electronic device 3 asking the customer/electronic device holder if they desire to "unlock the vestibule" door 14. If the customer decides to unlock the door then they may click a "yes" button, for example, and the door 14 will be unlocked as discussed above.

In another configuration, the system 100 of FIG. 1 determines when a customer approaching the beacon 1 is to be greeted by someone, for example, banking personnel. In this embodiment, an electronic device 3 that is carried by a customer 7 is running software 5 to detect the beacon 1 when the electronic device 3 moves within range of the beacon 1 detects the beacon 1. Upon detecting the beacon 1, the electronic device 3 sends a unique identifier to the server 9 identifying the electronic device 3 associated with the customer 7. Upon verifying the unique identifier is associated with the customer, the server 9 may cause a data message to be sent to a person or to another system that is to be alerted when the customer 7 in possession of or associated with the electronic device 3 arrives at a location near the beacon 1.

This may allow for, in the case of a bank, banking personnel or systems, to provide select service to select users.

Figure 3:
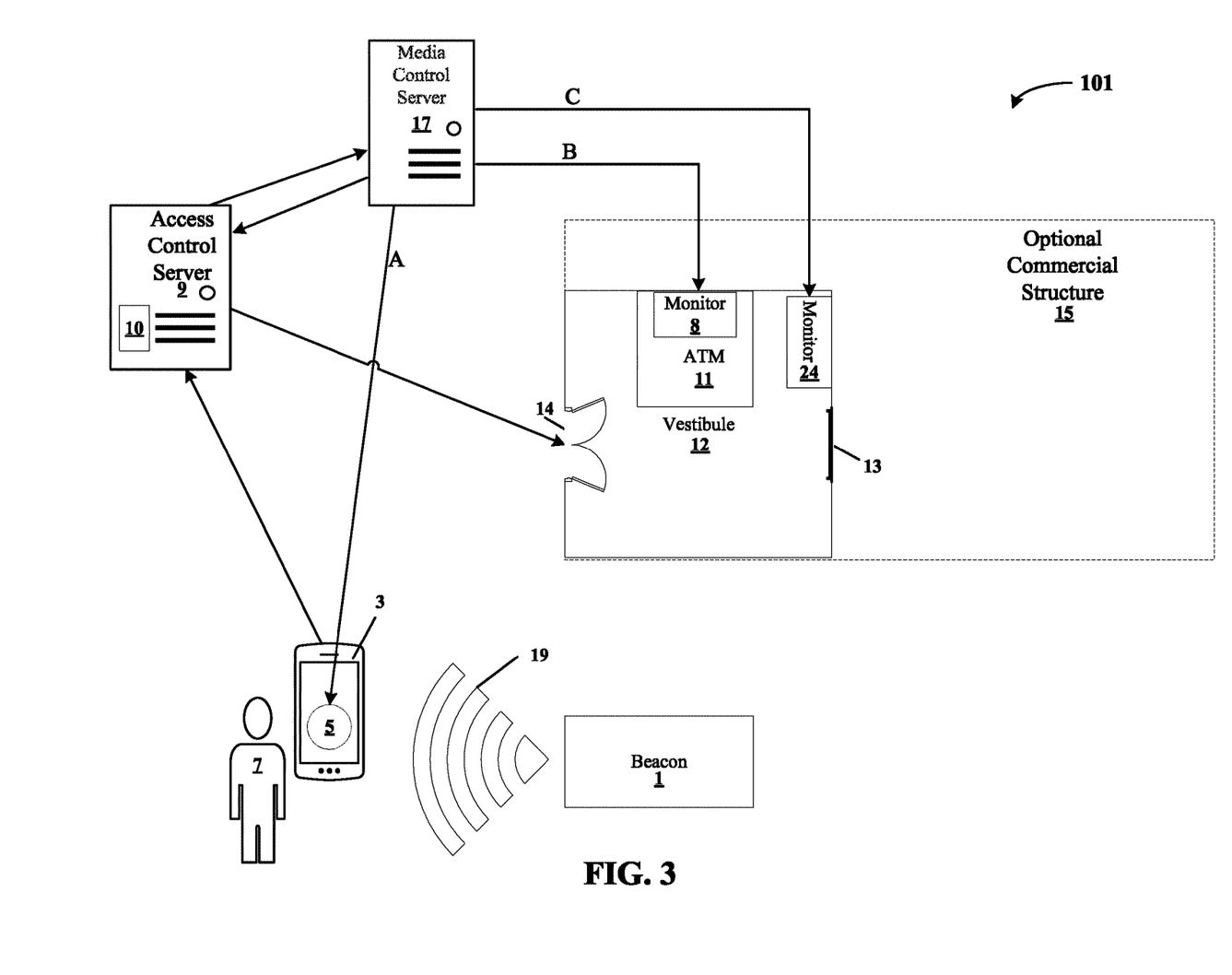
FIG. 3 is a schematic illustration of a system including an ATM and an associated beacon according to a second embodiment.

Another embodiment is a system 101 that can tailor information and/or advertisements displayed on the ATM or other screens is illustrated in FIG. 3. Similar to the system 100 of FIG. 1, the system 101 of FIG. 3 includes a beacon 1, a server 9, a vestibule 12, an ATM 11 with a monitor 8, a door 14 providing external access to the vestibule 12, a door 13 providing internal access to the vestibule 12 and an optional commercial structure 15 adjacent the vestibule 12. This system 101 further includes a wall mounted monitor 24 that may be a television monitor as well as a media control server 17. In some embodiments, the media control server 17 may be merged together with or included in the access control server 9.

In operation, a customer 7 carries the electronic device 3 (e.g., phone) in range of the beacon 1, as the beacon 1 transmits a wireless signal/electromagnetic waves 19 to the electronic device 3 running the software application 5. Upon detecting the wireless signal, the electronic device 3 sends an identity of the customer 7 who owns or is using the electronic device 3 to the access control server 9 so that identity of the customer can be verified and the door 14 may be unlocked as described above. The identity of the customer 7 may also be sent to the media control server 17 where upon verifying the identity is valid the media control server 17 is configured to send data to the monitor 8 (Arrow B) on the ATM to cause the monitor 8 to present information tailored to the customer based, at least in part, on identity of the customer and any prior know information retained about the customer. The media control server 17 may instead or in addition to the monitor 8 send information for display on the wall monitor 24 (Arrow C) and/or a display on the electronic device 3 (Arrow A). The information displayed on these devices may be periodically updated or changed based on how long the customer 7 is in the vestibule 12 or at the ATM 11. However, the updated information may still be personalized to the customer.

Figure 4:
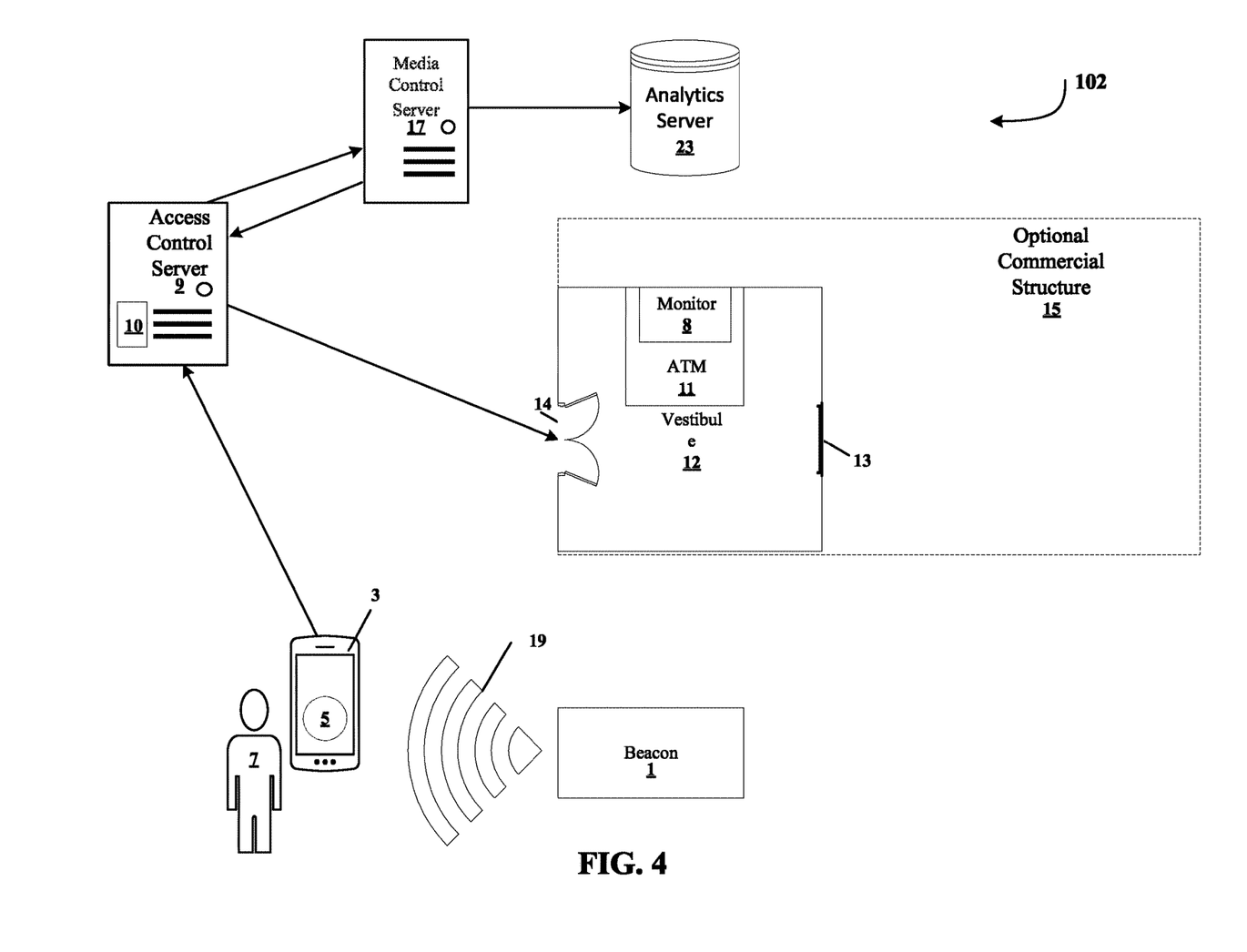
FIG. 4 is a schematic illustration of a system including an ATM and an associated beacon according to a third embodiment.

FIG. 4 illustrates a system 102 similar to the system 100 of FIG. 1 additionally includes a media control server 17 and an analytics server 23 that may operate as a database. In the embodiment of FIG. 4, the electronic device 3 running a software application 5 detects the beacon 1, as discuss earlier, as a customer 7 with the electronic device 3 approaches the beacon 1. The electronic device 3 sends wireless data to the access control server 9 indicating a unique identity the electronic device 3. The access control server 9 causes periodic collecting of data from the electronic device 3 associated with the customer 7 and then storing the data in the analytics server 23 (e.g., database). In some embodiments, the electronic device 3 (or more accurately an application running on the device) may keep track of recently visit web pages and what types of web pages the customer 7 visits on the electronic device 3, what products the customer purchased through the electronic device, and other data as understood by those of ordinary skill in the art. When authorized by the user of the electronic device 3, the electronic device may directly or indirectly periodically provide some or all of this information to the analytics server 23 or another server.

Other embodiments of FIG. 4 include a network connected to the ATM 11 and an intelligent display device capable of connecting to the network to receive data and display data tailored to the customer 3 from the media control server 17. In other configurations, this data may be displayed on the screen 8 of the electronic device 3 or other monitors in the vestibule. The data is tailored to the customer based on data stored in the database 23. The media control server 17 may change the displayed content based on data stored in the database 23 while using the data in the database 23 to ensure the new information is still tailored to the customer 7 using the electronic device 3. In some configurations, the media control server 17 or other servers may at times display "private" commands that others are not intended to view. In these configurations, if the media control server 17 or another servers sees more than a fixed number of electronic devices authenticated/logged into the vestibule 12 then the media control server may blur ATM screen and offer to continue or stop transactions to the ATM 11 monitor 8 and/or other monitors in the vestibule.

In another configuration of the system 102 of FIG. 4, the media control server 17 prompts the customer with a message on the monitor 8 (e.g., display) of the ATM 11 if the customer desires an advertisement to be sent to the customer. If so, the advertisement is then sent to the electronic device 3 for later viewing.

Figure 5:
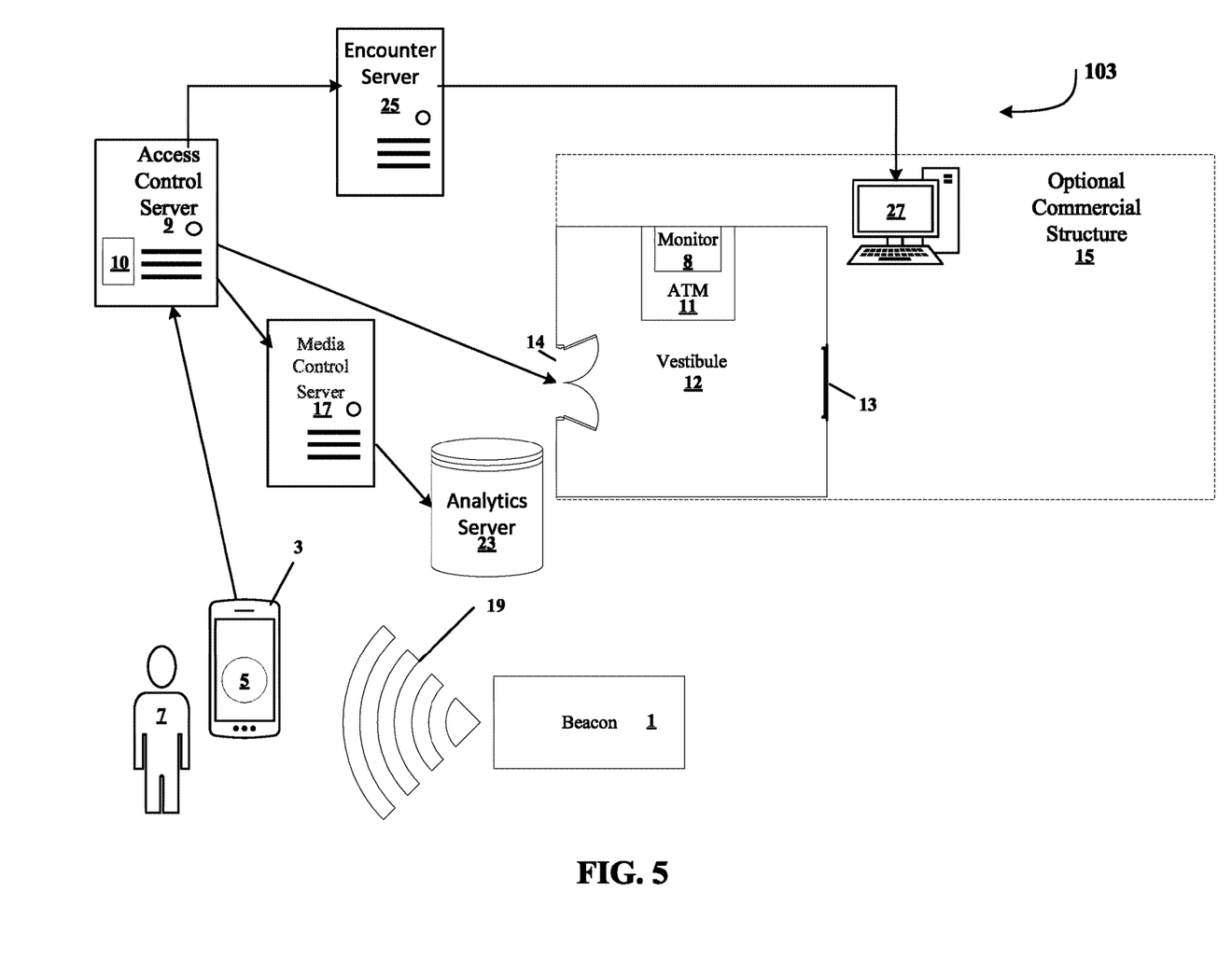
FIG. 5 is a schematic illustration of a system including an ATM and an associated beacon according to a fourth embodiment.

FIG. 5 illustrates an example system 103 that tracks the activity of multiple customers with electronic devices. Similar to the system 102 of FIG. 4, the system 103 has a beacon 1, a server 9, a vestibule 12 (also called a banking area in this embodiment), an ATM 11 with a monitor 8, a door 14 providing external access to the vestibule 12, an interior access door 13, a media control server 17, an analytics server 23 and an optional commercial structure 15 adjacent the vestibule 12. This system 103 further includes an encounter server 25 and a control terminal 27. In this embodiment, two or more electronic devices running software detect the beacon 1 as customers carry the electronic devices 3 move within range of the beacon 1. As the electronic devices 3 detect the beacon 1 the electronic devices 3 send unique identifiers to the access control server 9 that identify each of the electronic devices 3 as associated with one of the customers. Upon verifying a unique identifier, the server 9 is configured to periodically collect data from that single electronic device associated with one single unique identifier and stores this data in the analytic server 23. The encounter server 25 is configured to, based on the periodically collected data, to perform one or more of tracking flow patterns of customers in the banking area, schedule appointments with customers, log duration of customer visits, log which customer 7 was at what location at what time and for how long and generate an alert at the control terminal 27 when the data is not within predetermined range of values so that corrective action may be taken.

In another configuration, the encounter server 25 may contain a list of appointments for customers scheduled to visit the commercial structure 15. As customers arrive for these appointments, the system 103 of FIG. 5 may detect them via the beacon and as discussed above, banking (or other) personnel may approach and greet these prescheduled customers, or other automated systems may prepare for their arrival.

In another embodiment, the system 103 tracks the ATM transactional activity of multiple customers with electronic devices. Electronic devices 3 run software 5 to detect the beacon 1. As the electronic devices 3 are carried by customers move within range of the beacon 1, the electronic devices 3 are configured to detect the beacon. Upon detecting the beacon, the electronic devices 3 send a unique identifier to the access control server 9 identifying an electronic device 3 associated with one of the customers 7. Upon authenticating the unique identifiers, the encounter server 25 periodically collects analytical data related to ATM transactions from the electronic devices and/or the ATM and stores this data in the analytic server 23. The analytical data may be one or more of the duration of customer visits at an ATM, time at an ATM, ATM transactional information, and the like. The encounter server 25 generates an alert at the control terminal 27 when one or more of the analytical data fall outside of an acceptable range.

Figure 6:
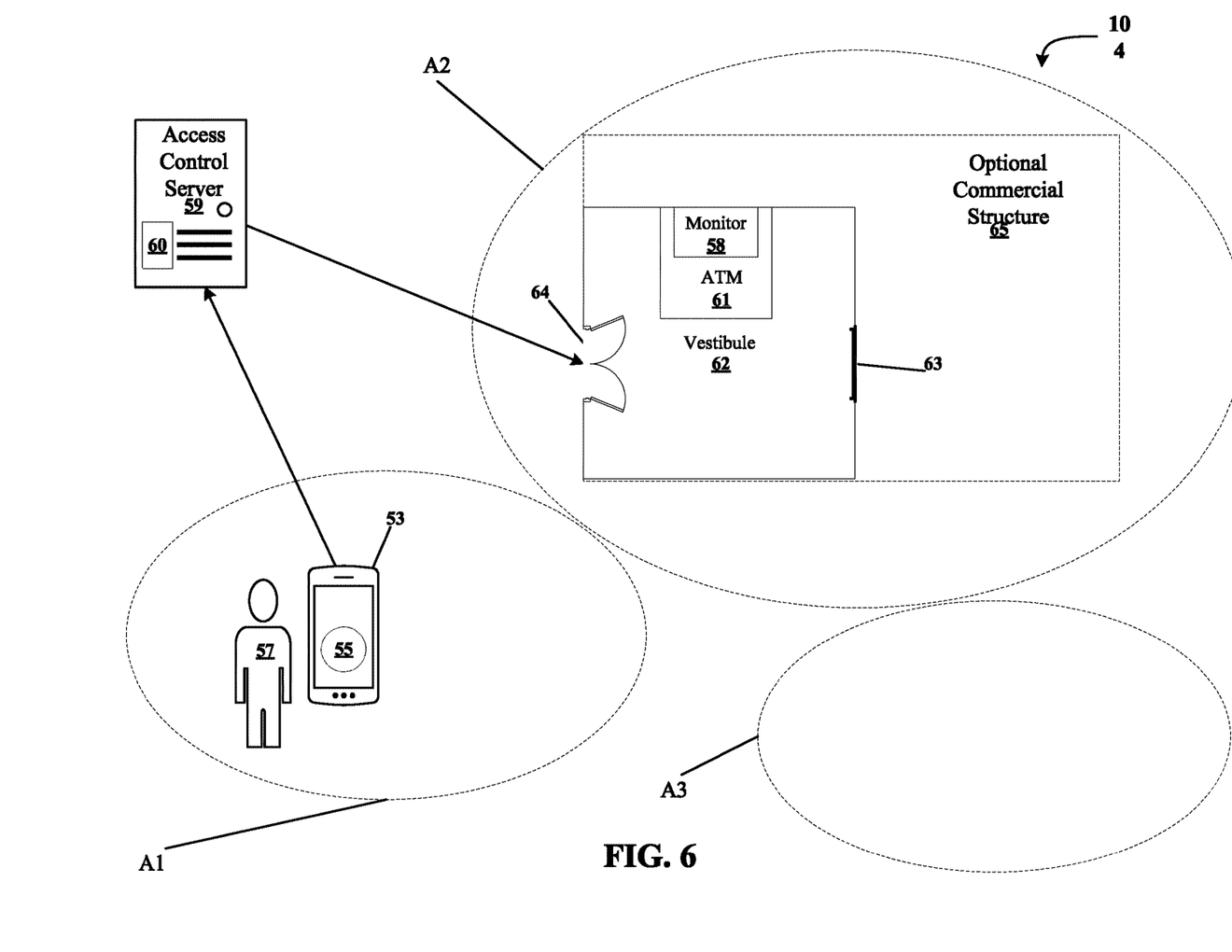
FIG. 6 is a schematic illustration of a system including an ATM and a related geo-fencing system.

FIG. 6 illustrates an example system 104 that uses geo-fencing to locate an ATM. The system 104 includes an access control server 59 with a processor 60 and other logic. The system 104 further includes a vestibule 62 housing an ATM 61 having a monitor 58. The vestibule 62 has exterior doors 64 and interior door(s) 63 that lead into an optional commercial structure 65, as illustrated. In this embodiment, FIG. 6 illustrates that a geo-fencing system has partitioned the areas around the vestibule 62 into three different areas including area A1, area A2 and area A3, as illustrated. Areas A1-3 may also be call "cells". These areas A1-3 may be bound by global positioning satellite (GPS) coordinates, cell tower/antenna coordinates or in another way as understood by one of ordinary skill in the art. Notice that the geo-fencing system has pre-designated the vestibule 62 and ATM 61 to be in area A2 (or cell A2).

In operation, a customer in possession of the electronic device 53 may roam from area A1 into area A2. Upon making this transition into area A2, the geo-fencing software 55 running in electronic device 53 determines that the electronic device is now in geo-fenced area A2 that also has the vestibule 62 in it. The electronic device 53 and its software 55 also determine that the ATM 61 is located in area A2. Upon detecting the ATM 61 is within geo-fencing area A2, the electronic device 53 sends a message to the server 59 indicating the electronic device 53 is in geo-fenced area A2 with the ATM 63 together with an identification of the electronic device 53. After verifying the identification of the electronic device 53 and its associate customer are permitted inside the vestibule 62, the server 59 causes data to be sent to a lock on the door 64 to unlock the door 64. Of course, in some embodiments the electronic device may prompt the customer via the electronic device after entering area A2 to inquire if they desire to enter the vestibule 62. Only if the customer replies that they do wish to enter the vestibule, the electronic device 53 send a message to the server 59 indicating the electronic device 53 is in geo-fenced area A2 with the ATM 61 together with an identification of the electronic device 53 and request access to the vestibule.

Example methods may be better appreciated with reference to flow diagrams. While for purposes of simplicity, explanation of the illustrated methodologies are shown and described as a series of blocks. It is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 7:
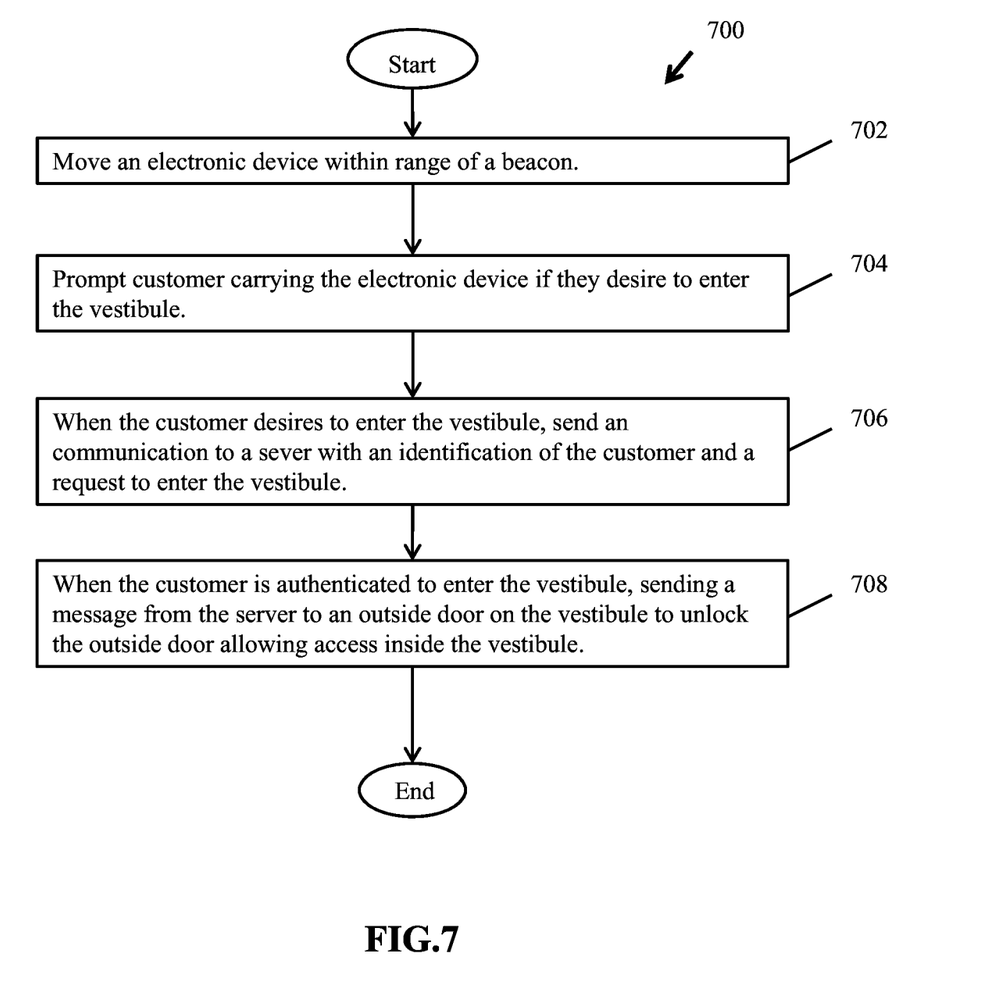
FIG. 7 is a flowchart illustrating a method of accessing a secured area.

FIG. 7 illustrates a method 700 of opening a vestibule door. The method 700 begins by moving an electronic device within range of a beacon, at 702, to detect the beacon with the electronic device. The beacon is associated with an ATM inside the vestibule and may be detected by the electronic device as discussed above. A customer carrying the electronic device is prompted, at 704, if they desire to enter the vestibule and use the ATM. When the customer desires to enter the vestibule, a communication is sent to a server, at 706, with an identification of the customer and a request to enter the vestibule. When the customer is authenticated to enter the vestibule, a message is sent from the server to an outside door on the vestibule to unlock the outside door, at 708, allowing access inside the vestibule.

While principles and modes of operation have been explained and illustrated with regard to particular embodiments, it must be understood, however, that this may be practiced otherwise than as specifically explained and illustrated without departing from its spirit or scope.

What is claimed is:

1. A method of accessing a secure area containing an automated transaction machine, the method comprising:
    providing a secure door for entry to the secure area, the secure door having a lock;
    providing a beacon associated with the automated transaction machine, the automated transaction machine having a display;
    transmitting, by the beacon, a wireless signal representing a unique identification of the beacon to an electronic device associated with a user;
    receiving, by the lock, authorization data representing a unique identification of the electronic device from an access server; and
    unlocking the secure door to allow the user access to the secured area.

2. The method according to claim 1, further comprising making at least partially opaque at least a portion of the display of the automated transaction machine.

3. The method according to claim 1, further comprising providing a second door spaced from the secure door.

4. The method according to claim 1, further comprising:
    providing a monitor on a wall in the secure area;
    receiving, by the monitor, display data tailored to the user from a media control server, the display data based, at least in part, on the unique identification of the electronic device;
    displaying, by the monitor, the display data.

5. The method according to claim 4, further comprising displaying, by the display, the display data tailored to the user.

6. The method according to claim 1, wherein the secure area is a vestibule.

7. The method according to claim 1, further comprising providing a control terminal on which an alert can be generated by an encounter server.

8. A method of accessing a secure area containing an automated transaction machine, the method comprising:
    providing an access control server;
    receiving, by the access control server, data representing a unique identification of an electronic device associated with a user and data representing a unique identification of a beacon associated with the secure area;
    verifying, by the access control server, a unique identifier associated with the electronic device;
    sending, by the access control server, authorization data representing the unique identification of the electronic device associated with the user to a lock associated with the secure area; and
    implementing, by the access server, privacy enhancements that include making at least partially opaque at least a portion of a display associated with the automated transaction machine.

9. The method of claim 8 further comprising:
    causing, by the access server, the display to present information tailored to the user.

10. The method of claim 9, further comprising:
causing, by the access server, the display to present information once the electronic device is determined to be within a predetermined distance from the beacon.

11. The method of claim 8, further comprising:
providing a media control server;
sending, by the access control server, data representing a unique identification of an electronic device associated with the user to the media control server;
sending, by the media control server, the data representing a unique identification of an electronic device associated with the user to a group consisting of a display on the electronic device, a display associated with the automated transaction machine, and a monitor on the automated transaction machine; and
causing, by the media control server, information tailored to the user to be displayed on a group consisting of a display on the electronic device, a display associated with the automated transaction machine, and a monitor on the automated transaction machine.

12. A method of accessing a secure area containing an automated transaction machine, the method comprising:
providing an access control server;
receiving, by the access control server, data representing a unique identification of an electronic device associated with a user and data representing a unique identification of a beacon associated with the secure area;
verifying, by the access control server, a unique identifier associated with the electronic device;
sending, by the access control server, authorization data representing the unique identification of the electronic device associated with the user to a lock associated with the secure area;
providing a media control server;
sending, by the access control server, data representing a unique identification of an electronic device associated with the user to the media control server;
sending, by the media control server, the data representing a unique identification of an electronic device associated with the user to a group consisting of a display on the electronic device, a display associated with the automated transaction machine, and a monitor on the automated transaction machine;
causing, by the media control server, information tailored to the user to be displayed on a group consisting of a display on the electronic device, a display associated with the automated transaction machine, and a monitor on the automated transaction machine;
collecting, by the access control server, periodic data representing a unique identification of an electronic device associated with the user;
providing an analytics server; and
storing, by the access control server, the periodic data representing a unique identification of an electronic device associated with the user, in the analytics server.

13. A method of accessing a secure area containing an automated transaction machine, the method comprising:
providing an access control server;
receiving, by the access control server, data representing a unique identification of an electronic device associated with a user and data representing a unique identification of a beacon associated with the secure area;
verifying, by the access control server, a unique identifier associated with the electronic device;
sending, by the access control server, authorization data representing the unique identification of the electronic device associated with the user to a lock associated with the secure area;
providing an encounter server and a control terminal;
collecting, by the encounter server, analytical data relating to representing unique identifications of a plurality of electronic devices associated with a plurality of users;
tracking, by the encounter server, the analytical data related to transactions on the automated transaction machine corresponding to the plurality of users; and
generating an alert, by the encounter server, at the control terminal, when one or more of the analytical data is not within a predetermined range of values.

14. A method of accessing a secure area containing an automated transaction machine, the method comprising:
providing an access control server;
receiving, by the access control server, data representing a unique identification of an electronic device associated with a user and data representing a geo-fenced area associated with the secure area;
verifying, by the access control server, a unique identifier associated with the electronic device;
sending, by the access control server, authorization data representing the unique identification of the electronic device associated with the user to a lock associated with the secure area; and
implementing, by the access server, privacy enhancements that include making at least partially opaque at least a portion of a display associated with the automated transaction machine.

15. The method of claim 14 further comprising:
causing, by the access server, the display to present information tailored to the user.

16. The method of claim 14, further comprising:
providing a media control server;
sending, by the access control server, data representing a unique identification of an electronic device associated with the user to the media control server;
sending, by the media control server, the data representing a unique identification of an electronic device associated with the user to a group consisting of a display on the electronic device, a display associated with the automated transaction machine, and a monitor on the automated transaction machine; and
causing, by the media control server, information tailored to the user to be displayed on a group consisting of a display on the electronic device, a display associated with the automated transaction machine, and a monitor on the automated transaction machine.

17. A method of accessing a secure area containing an automated transaction machine, the method comprising:
providing an access control server;
receiving, by the access control server, data representing a unique identification of an electronic device associated with a user and data representing a geo-fenced area associated with the secure area;
verifying, by the access control server, a unique identifier associated with the electronic device;
sending, by the access control server, authorization data representing the unique identification of the electronic device associated with the user to a lock associated with the secure area;
providing a media control server;

sending, by the access control server, data representing a unique identification of an electronic device associated with the user to the media control server;

sending, by the media control server, the data representing a unique identification of an electronic device associated with the user to a group consisting of a display on the electronic device, a display associated with the automated transaction machine, and a monitor on the automated transaction machine;

causing, by the media control server, information tailored to the user to be displayed on a group consisting of a display on the electronic device, a display associated with the automated transaction machine, and a monitor on the automated transaction machine;

collecting, by the access control server, periodic data representing a unique identification of an electronic device associated with the user;

providing an analytics server; and storing, by the access control server, the periodic data representing a unique identification of an electronic device associated with the user, in the analytics server.

18. A method of accessing a secure area containing an automated transaction machine, the method comprising:

providing an access control server;

receiving, by the access control server, data representing a unique identification of an electronic device associated with a user and data representing a geo-fenced area associated with the secure area;

verifying, by the access control server, a unique identifier associated with the electronic device;

sending, by the access control server, authorization data representing the unique identification of the electronic device associated with the user to a lock associated with the secure area;

providing an encounter server and a control terminal;

collecting, by the encounter server, analytical data relating to representing unique identifications of a plurality of electronic devices associated with a plurality of users;

tracking, by the encounter server, the analytical data related to transactions on the automated transaction machine corresponding to the plurality of users; and generating an alert, by the encounter server, at the control terminal, when one or more of the analytical data is not within a predetermined range of values.

* * * * *